United States Patent Office 3,177,193
Patented Apr. 6, 1965

3,177,193
PROCESS OF IMPROVING THE MOLDABILITY AND EXTRUDABILITY OF SOLID OLEFIN POLYMERS
John N. Scott, Jr., Bartlesville, Okla., assignor to Phillips Petroleum Company, a corporation of Delaware
No Drawing. Filed July 15, 1960, Ser. No. 42,984
2 Claims. (Cl. 260—94.9)

This invention relates to moldable compositions and method for preparing said compositions. In one aspect the invention relates to moldable compositions prepared by heating high molecular weight polymers to temperatures below their softening points in an oxygen-containing atmosphere. In another aspect the invention relates to a process for preparing moldable compositions from olefin polymers having a molecular weight of at least about 75,000 by heating said polymers to temperatures below their softening points in the presence of an oxygen-containing gas.

This application is a continuation-in-part of my copending application Serial No. 661,008, filed May 23, 1957, now abandoned.

As used herein the term "olefin polymer" is intended to include both homopolymers and copolymers of olefins.

Ethylene, propylene and higher 1-olefins can be polymerized to form polymers having molecular weights of 150,000 or higher. For example, ethylene and mixtures of ethylene and other olefins can be polymerized in the presence of a chromium oxide catalyst containing hexavalent chromium, and a liquid hydrocarbon diluent to form products having molecular weights as high as 148,000 or higher.

While the high molecular weight polymers possess considerable utility, it has been found that as their molecular weights increase the polymers become more difficult to mold. For example, when the polymer molecular weight exceeds about 75,000 conventional injection molding and extruding become difficult.

It is an object of this invention to provide improved moldable composition from high molecular weight olefin polymers.

Another object of this invention is to provide moldable polymer compositions from olefin polymers having molecular weights not less than about 75,000.

Still another object of this invention is to provide moldable compositions from polymers of 1-olefins having a maximum of 8 carbon atoms per molecule and no branching nearer the double bond than the 4-position, said polymers having molecular weights not less than about 75,000.

Yet another object of this invention is to provide a process for preparing moldable compositions from high molecular weight olefin polymers.

These and other objects of the invention will become more readily apparent from the following detailed description and discussion.

In the broad aspect the compositions of this invention comprise moldable compositions prepared by heating normally solid olefin polymers having molecular weights of at least about 75,000 in the presence of an oxygen-containing gas to a temperature below their softening points for a sufficient period of time to improve the moldability and extrudability of said polymer.

In another aspect the polymers are heated for a sufficient period of time to provide a moldable composition having a high load melt index of at least about 0.1, preferably a low load melt index of at least 0.5.

The polymers which form the starting materials in the preparation of the compositions of this invention include a wide variety of olefin polymers, such as, for example, polymers or copolymers of monoolefins like ethylene, propylene, butenes, pentenes, etc. The invention is particularly applicable to polymers of 1-olefins having a maximum of 8 carbon atoms per molecule and no branching nearer the double bond than the 4-position. The starting materials can comprise high molecular weight polymers prepared by contacting an olefin feed with a chromium oxide catalyst containing hexavalent chromium and associated with at least one supporting material selected from the group consisting of silica, alumina, zirconia and thoria, and a liquid hydrocarbon diluent material at a temperature of between about 150 and about 250° F. The catalyst employed was originally disclosed in the patent of Hogan and Banks, Patent No. 2,825,721, issued March 4, 1958, and catalyst details, including the methods of preparation, etc., are fully disclosed in that application.

In the preparation of the high molecular weight polymers an olefin such as ethylene is contacted in a reaction zone with the aforementioned chromium oxide catalyst in a liquid selected from the group consisting of paraffinic and naphthenic hydrocarbons. The contacting occurs at a temperature in the range of 150 to 230° F. when the liquid hydrocarbon is a paraffin and at a temperature in the range of 150 to 190° F. when the liquid hydrocarbon is a naphthenic hydrocarbon. Following the reaction a mixture of liquid hydrocarbon and polymer is removed from the reaction zone and the polymer is recovered from the mixture.

The liquid hydrocarbon referred to serves as an inert diluent and also as a heat transfer medium in the reaction. While the liquid hydrocarbon is a solvent for the ethylene feed it does not dissolve the polymer at the temperature at which polymerization is carried out. Thus, the polymer product precipitates from the liquid in the form of small particles which contain the catalyst, from which the polymer can be separated if so desired in subsequent processing steps. In general, hydrocarbons which can be used in the process are those which are liquid and chemically inert under the reaction conditions. Among the more useful hydrocarbons are paraffins having between about 3 and about 12 carbon atoms per molecule such as for example propane, isobutane, normal pentane, isopentane, isooctane, etc. and preferably those paraffins having 5 to 12 carbon atoms per molecule. Also useful in the polymerization reaction are alicylclic hydrocarbons such as isohexane, methylcyclohexane, etc. It is also within the scope of this method to utilize mixtures of paraffins and alicyclic hydrocarbons as the reaction medium.

The chromium oxide catalyst employed in carrying out the reaction can range in chromium oxide content from 0.1 to 10 or more weight percent, e.g. up to about 50 percent or higher, usually 50 percent or less, but the preferred range is from 2 to 6 weight percent, expressed as elemental chromium. A preferred nonchromium component is a silica-alumina composite containing a major proportion of silica and a minor proportion of alumina. While the method for preparing the silica-alumina composite undoubtedly affects to some extent the catalyst activity, it appears that composites prepared by any of the prior art processes for preparing such catalytically active composites, e.g., coprecipitation or impregnation, are operative for the process of this invention. Methods for the preparation and activation of this catalyst are described in detail in Hogan and Banks patent, supra. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., under non-reducing conditions, for example, with a stream of substantially anhydrous (dew point preferably 0° F. or lower) oxygen-containing gas, such as air. A commercial microspheroidal silica-alumina composite can also be advantageously used in the preparation of the catalyst.

The high molecular weight polymers can also be prepared by other methods and by the use of other catalysts. For example, the polymers can be prepared by utilizing a gas phase reaction wherein the olefin is passed as a gas through a stirred bed of catalyst or contacted with catalyst in a fluidized system. In such a process no hydrocarbon diluent is employed and the polymer is recovered in the dry state associated with the polymerization catalyst. Nonequivalent catalysts which can be (less desirably) employed other than the chromium oxide catalyst are organo-metallic compounds such as triethyl-aluminum plus titanium tetrachloride, mixtures of ethyl-aluminum halides with titanium chlorides and the like; halides of a Group IV metal, such as for example titanium tetrachloride, silicontetrabromide, zirconium, tetrachloride, tin tetrabromide, etc., with one or more free metals selected from the group consisting of sodium, potassium, lithium, rubidium, zinc, cadmium, aluminum, etc.

The high molecular weight olefin polymers are characterized by having very high melt viscosities and a high degree of crystallinity. The melt index of these polymers, which is a function of their viscosity, is not readily measurable by standard techniques and thus is designated as zero. It has been commonly supposed that these low melt index polymers are difficultly moldable and extrudable in present conventional equipment which are essentially limited to the molding of thermoplastic materials having a high load melt index of at least 0.1 as determined by the use of the high load technique hereinafter described.

For low load melt index, the method of ASTM D-1238-52T is used with five runs being run at 2-minute intervals, averaging the five weights, discarding any values which deviate from the average by more than 5 weight percent, reaveraging and multiplying by 5 to obtain the amount of extrudate in 10 minutes. If the melt index is low, such as less than 1.0, the high load melt index may be obtained by ASTM D-1238-57T (procedure 5) using a weight of 21,600 grams.

In carrying out the invention in one aspect thereof, a high molecular weight polymer such as a polymer of ethylene is heated to a temperature below its softening point in the presence of an oxygen-containing gas for a sufficient period of time to improve its moldability and extrudability, preferably the high load melt index is increased to at least about 0.1, more preferably 1.0, and even more preferably a low load melt index of at least 0.5. The high molecular weight polyethylenes are employed as the starting materials in this invention have softening points which usually do not exceed about 265° F., and this temperature therefore sets an approximate upper limit for the heating operation when polyethylenes are treated. The maximum temperatures are often higher for polymers of propylene or 4-methyl-1-pentene. The invention can be carried out at as low a temperature as 32° F.; however, practically, to provide the desired results within a reasonable period of time, the heating step is carried out at a minimum temperature of about 150° F. A more preferred temperature range is from about 200 to 265° F. The time required to effect the conversion of the difficultly moldable high molecular weight polymers to polymers having improved moldability and extrudability can vary from a few minutes to as high as several hundred hours, however, usually the time required is between about 10 minutes and about 100 hours.

Both the time and temperature employed are dependent on the properties of the specific high molecular weight polymer being treated. Thus, for example, when an olefin polymer having a molecular weight of about 100,000 is used as the starting material; with a heating temperature of about 210° F., the time required is about 20 to 30 hours. The same polymer when heated at 265° F. however, requires only about 2 hours. Correspondingly an olefin polymer of about 150,000 molecular weight requires 55 to 60 hours at 210° F. and only about 4 hours at 265° F.

Suitable atmospheres for carrying out the invention include air, oxygen-enriched air, oxygen, and ozone or ozone-containing gases. Conversion of the high molecular weight polymers to the moldable compositions of this invention can be accelerated by the use of ultraviolet light in addition to heat.

The time required for carrying out the heating operation also depends on the surface area of the high molecular weight polymer. Polymers prepared by the aforedescribed methods are characterized when in particle form by having a very high porosity and even large particles of the polymer have a high surface-to-volume ratio. Thus the invention can be carried out by utilizing large polymer particles, of a size as large as ¼″ in diameter. However, preferably the polymer particles size is less than ⅟₁₆″. Conversion of the high molecular weight polymer can be carried out in a bed, either fixed or fluidized, or by otherwise suitably exposing the polymer to an oxygen-containing gas. If a fluidized technique is employed, it is desirable that the polymer particles be more finely subdivided to provide adequate fluidization.

By operating in accordance with the process of this invention compositions having a melt index of as high as 20 or more can be prepared from high molecular weight polymers, having a molecular weight of at least about 75,000 and a substantially zero low load melt index. Any desired level of melt index can be obtained by properly adjusting the conditions employed in the aforedescribed process. Since the process of the present invention incorporates a minor amount of oxygen into the polymer some peroxide groups are present in the final composition. To prevent cross linking during heating and subsequent fabrication operations a suitable antioxidant can be incorporated into the moldable compositions after the heating step. Examples of suitable antioxidants of the free radical acceptor type are amines such as N,N-diphenyl-para-phenylenediamine, substituted phenols such as 2,6-di-tertiary-butyl-4-methylphenol, alpha and beta conindendrols, reaction products of substituted phenols such as the reaction product of acetylene with alkyl substituted phenols, quinones, etc.

The principal advantage of the moldable compositions of this invention lies in their improved moldability as compared to the starting materials. However, other advantages accrue because of the minor amount of oxygen which is introduced into the polymer. Thus the compositions of this invention have increased dyeability, increased printability, increased water adsorptiveness and because of their increased polarity they can be advantageously used where it is desired to reinforce the polymer by means of fillers. Increased polarity of the compositions also provides greater adherence when the compositions are laminated as sheets to other thermoplastics or other thermosetting materials.

Various processes have been described in the prior art for bringing about the oxidation of olefin polymers; however, the prior art processes have been devoted exclusively to the treatment of polymers resulting from high pressure type olefin polymerization. The properties of the high pressure polymers have been such that oxidation of these materials has resulted in their degradation to waxy materials. The compositions of this invention, however, are solid nonwaxy materials having very desirable properties of tensile strength, crystallinity, etc. as compared to both the starting materials employed and conventional olefin polymers of high molecular weight.

The following data are presented in illustration of a specific embodiment of the invention:

EXAMPLE

A series of runs were made in which high molecular weight, highly crystalline ethylene polymer, prepared by a chromium oxide catalyzed polymerization, was converted to a moldable composition.

Ethylene was polymerized in the presence of normal pentane and finely subdivided chromium oxide catalyst comprising 2.5 percent chromium as chromium oxide containing 2.2 percent hexavalent chromium supported on silica alumina (90/10). The catalyst was prepared by impregnating silicia alumina with chromium trioxide solution followed by drying and activation in dry air at temperatures up to 950° F. for several hours.

The conditions prevailing during the polymerization reaction were as follows:

POLYMERIZATION CONDITIONS

| | |
|---|---|
| Temperature ° F | 210 |
| Pressure p.s.i.a | 375–470 |
| Ethylene feed rate ft.³/hr | .35 |
| Pentane gal./hr | 1.3 |
| Catalyst concentration in reactor wt. percent | 0.68 |
| Chromium content in catalyst do | 2.5 |
| Polymer concentration in reactor do | 15.5 |

The polymer from the above process had the following properties.

POLYMER PROPERTIES

| | | Test Method |
|---|---|---|
| Ash, wt. percent | 0.64 | |
| Molecular weight (by Inherent Viscosity) (1) | 145,000 | |
| Density, grams/cc. (2) | 0.955 | |
| Softening Temperature, ° F. (3) | 263 | |
| Crystalline Freeze Point, ° F. (4) | 254 | |
| Flex Temperature, ° F | 96 | Method of Clash and Berg. Ind. & Eng. Chem. 34, 1218 (1942). |
| Environmental Stress Cracking (F–50), hours (5). | 560 | |
| Impact Strength, ft. lbs./inch-notch | 18.26 | ASTM D–256–54T. |
| Stiffness, p.s.i | 146,000 | ASTM D–747–50. |
| Tensile (compression molded) (20″/min. pull), p.s.i. | 4,100 | ASTM D–412–51T. |
| Elongation (compression molded) (20″/min. pull), percent. | 143 | ASTM D–412–51T. |

(1) Ind. & Eng. Chem. 35, 1108 (1943). The concept of molecular weight is more fully discussed in Hogan and Banks Patent No. 2,825,721, issued March 4, 1958. Unless otherwise specified, the term "molecular weight" as used herein means molecular weight based on inherent viscosity using the Staudinger equation (molecular weight=2.445×10⁴×inherent viscosity). Inherent viscosity is determined by measuring the time required for a filtered solution of 0.1000 gram of the polymer in 50 ml. of tetralin (measured at 75° F.) to run through the marked length on a size 50 (0.8 to 3.0 centistokes) Ostwald-Fenske viscosimeter at a temperature of 130° C., the viscosimeter being immersed in a thermostatically controlled oil bath, and measuring also the time required for an equal volume of tetralin containing no polymer to run through the same distance on the same viscosimeter. The inherent viscosity is calculated by the following formula:

$$\eta = \frac{\log V_r}{C}$$

wherein $C=0.183$ and $V_r$=time in seconds required for solution to run through viscosimeter divided by the corresponding time required for the polymer-free tetralin, both at 130° C.

(2) Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

(3) Adapted from method of Karrer, Davis and Dieterich, Ind. & Eng. Chem. (Anal. Ed.), 2, 96 (1930).

(4) Carried out by melting a sample of the polymer, inserting a thermocouple into the molten polymer and allowing the molten polymer to cool slowly. The temperature is recorded and is plotted on a chart versus time. The crystalline freeze point is the first plateau in the time-versus-temperature curve.

(5) Method of De Coste, Malm and Wallden, Ind. & Eng. Chem. 43, 117 (1951).

Samples of the above prepared polymer were placed in trays in a forced draft oven and maintained at 212° F. for varying lengths of time. The particles of polymer were approximately 1/64 inch in diameter and were of a highly porous nature. After the polymer had been heated in air at 212° F. for various lengths of time, the melt index of the material was determined. These results are given below as Table I.

Table I

| | Hours at 212° F. | | | |
|---|---|---|---|---|
| | 0 | 48 | 53 | 57 |
| Low Load Melt Index ¹ | 0.00 | 0.1002 | 0.414 | 1.15 |

¹ Test Method hereinbefore described.

The sample which had been maintained at 212° F. for 57 hours in the presence of air was examined for physical properties.

PHYSICAL PROPERTIES

| | | Test Method |
|---|---|---|
| Impact Strength, ft. lbs./inch-notch | 4.93 | ASTM D–256–54T. |
| Tensile Strength (Injection molded–20″/min. pull), p.s.i. | 4,874 | ASTM D–638–52T. |
| Elongation (Injection molded–20″/min. pull), percent. | 31 | ASTM D–638–52T. |

It is to be noted that the tensile strength of the composition which resulted after 57 hours of heating was very high and compares favorably with conventional solid polymers. Also, it is noted that the sample from which the tensile strength was obtained was prepared by injection molding, thus indicating the moldability of the composition.

The converted polymer (heated for 57 hours at 212° F.) was also examined by infrared spectrum to determine its molecular structure. These data are given below and compared with the data from the infrared spectrum of a high molecular weight highly crystalline ethylene polymer prepared under polymerization conditions similar to those listed above.

*Table II.—Infrared analysis*

[Figures are in groups/1,000 carbon atoms]

| | Terminal methyl Groups | Trans Unsaturated Groups | Vinyl Unsaturated Groups | Carbonyl Groups | Percent Crystallinity |
|---|---|---|---|---|---|
| High molecular weight, highly crystalline ethylene polymer heated for 57 hours at 212° F | <1.5 | 0.1 | 0.6 | 1-2 | 88 |
| Similar high molecular weight, highly crystalline ethylene polymer (unheated) | <1.5 | <0.1 | 0.8 | 0.0 | 91 |

It is to be noted that the unsaturation and crystallinity of the heated material was substantially unchanged from the corresponding properties of unheated high molecular weight polymer. The difference in carbonyl groups denotes the amount of oxygen contained in the heated composition.

Having thus described the invention by providing a specific example thereof it is to be understood that no undue limitations or restrictions are to be drawn by reason thereof and that many variations and modifications are within the scope of the invention.

I claim:

1. Process for increasing the melt index of a polyethylene having a melt index not above about 0.05 and having a high molecular weight which process comprises uniformly contacting said polyethylene in discrete finely divided form in solid state with elemental oxygen at temperatures in the range between about 100° C. and about 130° C. for a sufficient period of time to improve the moldability and extrudability of said polyethylene.

2. A method for improving the moldability and extrudability of a solid polymer of ethylene, said polymer having difficult moldability and extrudability and a molecular weight of at least about 75,000 and a substantially zero low load melt index and being prepared by contacting an ethylene-containing feed with a chromium oxide catalyst containing hexavalent chromium associated with at least one material selected from the group consisting of silica, alumina, zirconia and thoria at a temperature of between about 150 and about 250° F., which comprises heating said polymer in discrete finely divided form at a temperature of between about 150° F. and the softening point of said polymer in the presence of a fluid consisting essentially of molecular oxygen at substantially atmospheric pressure for between about 10 minutes and about 100 hours and recovering a moldable composition to increase the high load melt index of said polymer to at least 0.1.

References Cited by the Examiner

UNITED STATES PATENTS

| 2,825,721 | 3/58 | Hogan et al. | 260—94.9 |
| 2,910,460 | 10/59 | Aries | 260—94.9 |
| 2,955,105 | 10/60 | Fuchs | 260—94.9 |
| 2,972,605 | 2/61 | Natta et al. | 260—93.7 |
| 3,013,003 | 12/61 | Maragliano et al. | 260—93.7 |
| 3,050,514 | 8/62 | Cawthon et al. | 260—94.9 |

OTHER REFERENCES

Modern Plastics 32 (August 1955), 117–120 and 122.
Rubber and Plastics Age 36 (November 1955), 655.
"Polythene" (Renfrew), pub. by Iliffe and Sons Ltd. (London) 1957 (pages 71, 72, and 80).
"Polyethylene" (Kresser), pub. by Reinhold (New York), 1957, page 63.

JOSEPH L. SCHOFER, *Primary Examiner.*

M. LIEBMAN, L. H. GASTON, WILLIAM H. SHORT, *Examiners.*